Figure 1:
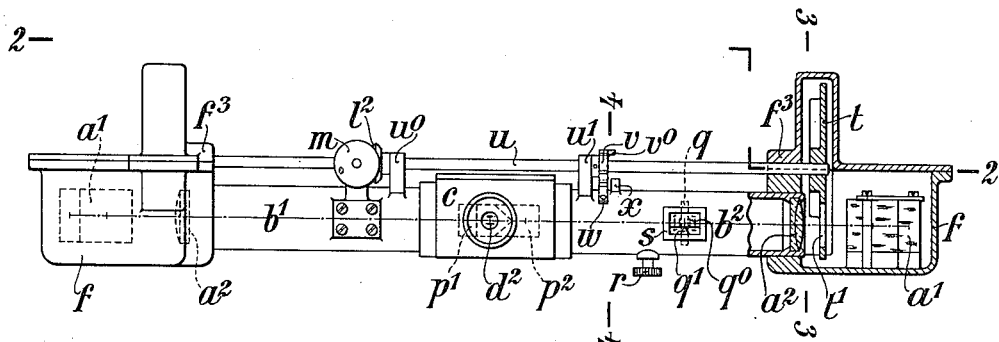

O. EPPENSTEIN.
HORIZONTAL TELEMETER.
APPLICATION FILED FEB. 12, 1915.

1,150,585.

Patented Aug. 17, 1915.

UNITED STATES PATENT OFFICE.

OTTO EPPENSTEIN, OF JENA, GERMANY, ASSIGNOR TO THE FIRM OF CARL ZEISS, OF JENA, GERMANY.

HORIZONTAL TELEMETER.

1,150,585. Specification of Letters Patent. Patented Aug. 17, 1915.

Application filed February 12, 1915. Serial No. 7,866.

*To all whom it may concern:*

Be it known that I, OTTO EPPENSTEIN, a citizen of the German Empire, residing at Jena, Germany, have invented a new and useful Horizontal Telemeter, of which the following is a specification.

The invention consists in an improvement in horizontal telemeters containing the base-line within the instrument in which, especially in those according to Patent 1,118,337 each of the two pencils of ray systems belonging to the ends of the base-line pierces a deflecting device of variable deflection, which permits of the image formed from the pencil system and presented to the observer, being displaced in the direction parallel to the base-line, both devices being coupled with one another in such a manner, that the two images for purposes of alteration of the direction of outlook, can be displaced in the direction of the base-line jointly by a small amount. In order to maintain the adjustment of such telemeter for all directions of outlook, the amount by which on actuating the deflecting devices the images will be displaced, must be absolutely the same. This however anticipates a precision of the single parts of the coupling and its gear with the telemeter, which is difficult to obtain in the actual manufacture and can scarcely be maintained in using the instruments. In order to avoid these difficulties according to the invention a continual displacement of the images is abandoned and the telemeter is provided with deflecting devices which consist each of a group of single deflecting devices of different deflection so that by passing over from one pair of these deflecting devices to another pair the two images are displaced by jumps.

In the drawing a coincidence telemeter in which the two images presented to the observer are erect is shown as a constructional example.

Figure 2:
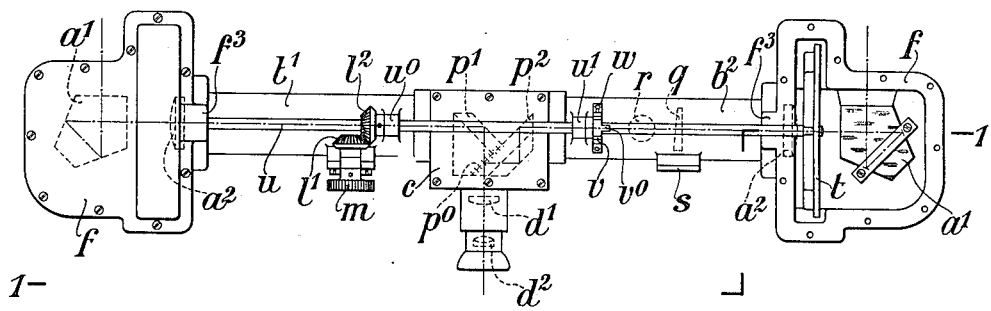
Figure 3:
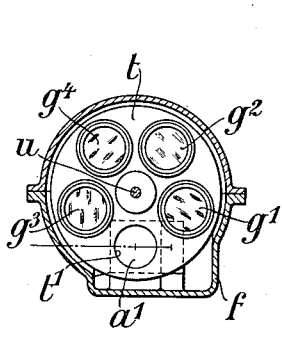
Figure 4:
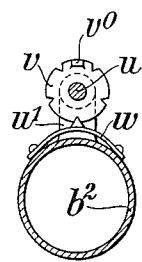

Figure 1 shows the instrument from the back, Fig. 2 is a plan view, Fig. 3 is a section and Fig. 4 shows a detail of construction on a larger scale than the other figures.

The objective systems each consist of a pentagonal prism $a^1$ and an objective lens $a^2$. An intermediate body $c$ connects the two tubes $b^1$ and $b^2$ carrying the objective lenses with one another and contains an ocular $d^1$, $d^2$ and also a separating prism system $p^1$, $p^2$. The cement layer $p^0$ between the two prisms $p^1$ and $p^2$, each of which is provided with a ridge, is formed in its upper half as a separating layer reflecting on both sides. A glass wedge $q$, which can be displaced by means of a milled head $r$, serves for making the measurements. A scale $q^0$ rigidly connected with the wedge $q$ and its index $q^1$ are visible through a window $s$. A group of four glass wedges $g^1$, $g^2$, $g^3$, $g^4$ is placed in front of each of the two objective lenses $a^2$, these wedges being fixed jointly on a disk $t$ in such a manner as to bring each of the four deflecting wedges into its effective position by rotating the disk about its axis. The disk $t$ has, moreover, an opening $t^1$ which allows the pencil of ray system coming from the pentagonal prism $a^1$ to pass without suffering deflection. This opening $t^1$ is in the position of the disk $t$ as shown in the drawing in its effective place, none of the deflection wedges being interpolated. The disposition of the deflection wedges is such that those wedges which can be brought to effect by a rotation of the disk $t$ in the one sense out of the position as shown in the drawing (for instance the wedges $g^1$ and $g^2$) effect an alteration of the direction of outlook in the one sense and that those wedges, which can be brought to effect by a rotation of the disk $t$ in the opposite sense (according to the above assumption the wedges $g^3$ and $g^4$) effect an alteration of the direction of outlook in the other sense. The deflecting effect of the wedge $g^2$ is hereby greater than that of the wedge $g^1$ and the deflecting effect of the wedge $g^4$ is greater than that of the wedge $g^3$, so that by a rotation of the disk $t$ out of the position as shown in the drawing, a transition from a central direction of outlook to such of growing inclination to the base-line of the instrument is effected. The two disks $t$ are fixed on a common shaft $u$ journaled in bodies $u^0$ and $u^1$ and in noses $f^3$; the shaft $u$ can be rotated by means of a bevel gear wheel $l^1$, $l^2$ and a milled head $m$. In order to easily find out those positions of the shaft $u$ in which the disks $t$ are adjusted each for one of the five directions of outlook, a ratchet wheel $v$ is fixed on same, in the rests of which engages a catch spring $w$ fixed on the tube $b^2$. A projecting lug $v^0$ of the ratchet wheel $v$ and a fixed stop $x$, adjusted on the tube $b^2$, limit the movement of the shaft $u$ in each sense.

When a telemeter, in which in order to carry out the measurement, the image of an object must be brought to a definite place of the field of view, for instance aside the image of the corresponding parts of a stereoscopic range scale, is equipped according to the invention, it is necessary on account of the limitation in the choice of the directions of outlook, to journal the instrument so as to be rotatable in the plane of triangulation by a small amount unless it be preferred to provide the telemeter with a second pair of deflecting devices, which still allows within comparatively narrow limits a continual displacement of the images.

I claim:

In a horizontal telemeter containing the base-line within the instrument a measuring device, an ocular system, an ocular reflecting system, at either side of the said ocular reflecting system an objective lens and a group of deflecting devices of different deflection, the said groups of deflecting devices being adapted to displace in the direction of the base-line by jumps the images formed from the ray pencil systems entering the instrument at either end of the base-line and actuating means for effecting a joint displacement of the two images in the same direction by a joint alteration of the setting of the said deflecting devices.

OTTO EPPENSTEIN.

In presence of—
  PAUL KRUGER,
  RICHARD HAHN.

Copies of this patent may be obtained for five cents each, by addressing the "Commissioner of Patents, Washington, D. C."